(12) United States Patent
Gottschlich et al.

(10) Patent No.: US 6,428,606 B1
(45) Date of Patent: Aug. 6, 2002

(54) MEMBRANE GAS SEPARATION PROCESS WITH COMPRESSOR INTERSTAGE RECYCLE

(75) Inventors: Douglas Gottschlich; Matthew Ringer, both of Mountain View, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 09/817,933

(22) Filed: Mar. 26, 2001

(51) Int. Cl.⁷ .............................. B01D 53/22
(52) U.S. Cl. .............................. 95/50; 95/39
(58) Field of Search .................. 95/39, 41, 42, 95/45, 47–56

(56) References Cited

U.S. PATENT DOCUMENTS

| | | | |
|---|---|---|---|
| 4,180,388 A | 12/1979 | Graham et al. | 55/16 |
| 4,180,552 A | 12/1979 | Graham et al. | 423/359 |
| 4,264,338 A | * 4/1981 | Null | 95/50 X |
| 4,553,983 A | 11/1985 | Baker | 55/16 |
| 4,717,407 A | 1/1988 | Choe et al. | 62/18 |
| 4,772,295 A | * 9/1988 | Kato et al. | 95/50 |
| 4,857,078 A | 8/1989 | Walter | 55/16 |
| 4,906,256 A | 3/1990 | Baker et al. | 55/16 |
| 4,963,165 A | 10/1990 | Blume et al. | 55/16 |
| 4,994,094 A | 2/1991 | Behling et al. | 55/16 |
| 5,032,148 A | 7/1991 | Baker et al. | 55/16 |
| 5,069,686 A | 12/1991 | Baker et al. | 55/16 |
| 5,089,033 A | 2/1992 | Wijmans | 55/16 |
| 5,127,926 A | 7/1992 | Baker et al. | 55/16 |
| 5,199,962 A | 4/1993 | Wijmans | 55/16 |
| 5,205,843 A | 4/1993 | Kaschemekat et al. | |
| 5,281,255 A | 1/1994 | Toy et al. | 95/50 |
| 5,374,300 A | 12/1994 | Kaschemekat et al. | 95/39 |
| 5,378,263 A | * 1/1995 | Prasad | 95/45 X |
| 5,482,539 A | * 1/1996 | Callahan | 95/45 X |
| 5,501,722 A | 3/1996 | Toy et al. | 95/50 |
| 5,538,536 A | * 7/1996 | Fuentes et al. | 95/45 |
| 5,707,423 A | * 1/1998 | Pinnau et al. | 95/50 X |
| 5,755,855 A | 5/1998 | Baker et al. | 95/39 |
| 5,769,927 A | 6/1998 | Gottschlich et al. | 95/39 |
| 5,772,734 A | * 6/1998 | Baker et al. | 95/50 X |
| 5,779,763 A | * 7/1998 | Pinnau et al. | 95/45 X |
| 5,785,739 A | 7/1998 | Baker | 95/39 |
| 5,980,609 A | * 11/1999 | Baker et al. | 95/50 X |
| 6,053,965 A | * 4/2000 | Lokhandwala | 95/50 X |
| 6,159,272 A | * 12/2000 | Baker et al. | 95/50 X |
| 6,350,371 B1 | * 2/2002 | Lokhandwala et al. | 95/50 X |

* cited by examiner

Primary Examiner—Robert H. Spitzer
(74) Attorney, Agent, or Firm—J. Farrant

(57) ABSTRACT

A process for treating a gas stream containing an organic component and a second gas. The process uses at least two compression stages, followed by membrane separation, with recirculation of the membrane permeate streams to different points in the compression train. The process provides particular benefits for separations characterized by modest membrane selectivity and a high concentration of the organic component in the remaining gas the compression steps.

40 Claims, 4 Drawing Sheets

MEMBRANE GAS SEPARATION PROCESS WITH COMPRESSOR INTERSTAGE RECYCLE

FIELD OF THE INVENTION

The invention relates to gas separation by means of membranes, and in particular to membrane processes used to separate organic compounds from gas mixtures.

BACKGROUND OF THE INVENTION

Gas streams containing organic compounds, such as light saturated and unsaturated hydrocarbons, are commonplace in the petrochemical industry, in gas and oil fields, and in refineries.

It has been known for many years that membranes can be used to treat such streams, to separate one or more of the organic components from one or more of the other gases, such as air, nitrogen, methane or hydrogen. A separation of this type requires a membrane to be selective either in favor of the organic component or in favor of the other gas. Membranes that use rigid glassy polymers as the selective material are generally selective in favor of smaller molecules over larger molecules, based on the faster diffusion of the small molecules, and thus tend to be selective for permanent gases and methane over organic compounds. Membranes that use elastomeric polymers as the selective material are generally selective in favor of larger, more condensable molecules over smaller molecules, based on the greater solubility of the large molecules in the polymer, and thus tend to be selective for organic compounds over permanent gases and methane.

U.S. Pat. Nos. 4,553,983; 4,857,078; 4,963,165; 4,906,256; 4,994,094; 5,032,148; 5,069,686; 5,127,926; 5,281,255 and 5,501,722 all describe such organic-selective membranes, and systems or processes using them.

It has also been known for many years that condensation and membrane separation may be combined into an integrated process for separating organic components from gas streams. This may be done, for example, by passing the uncondensed gas from the condensation step to a membrane separation step. If the membrane separation step produces an organic-enriched permeate, this permeate may be recirculated to the condensation step to increase the recovery of the organic component. U.S. Pat. Nos. 5,089,033; 5,199,962; 5,205,843; 5,374,300; 5,755,855; 5,785,739 and 5,769,927 all describe such processes.

It is further known that membrane separation processes can be carried out as single-stage or as multistage operations, with either the residue or the permeate streams, or both, from the first stage being sent to one or more additional membrane separation steps to increase the purity of those respective streams. For example, amongst the patents cited above, U.S. Pat. Nos. 5,089,033 and 5,199,962 show two-step configurations in which the residue from the first membrane separation step is passed for further treatment to a second membrane separation step.

Membrane processes are also used commercially for other gas separations, including separation of nitrogen from air, and of hydrogen from nitrogen. In these separations, both gases of the pair to be separated are permanent gases, that is, neither component is condensable except under cryogenic conditions of very high pressure and very low temperature. In this case, glassy polymer membranes, which preferentially permeate the smaller gas molecules on the basis of their faster diffusion through the polymer, are used. Separations using glassy membranes may also be performed as multistage operations, and may be used in conjunction with non-membrane separation operations. U.S. Pat. No. 4,717,407 discloses a two-stage membrane process combined with cryogenic separation to recover helium from a gas stream. U.S. Pat. No. 4,180,388 discloses a two-step membrane separation process in which the pressure ratio across the first step is lower than the pressure ratio across the second step. U.S. Pat. No. 4,180,552 discloses a process for hydrogen recovery from ammonia synthesis purge gas. The process involves separating hydrogen from nitrogen by means of a two-step membrane separation process. The two membrane separation steps are operated at different pressure ratios, as in the '388 patent, and the two permeates are recirculated to compressors in series used to compress the feed gases to the reactor.

Despite the extensive literature, designing an energy and cost-efficient process for any particular separation remains difficult, because performance can be influenced by many factors, including intrinsic selectivity of the membrane, flux of the membrane, membrane area used, pressure difference between feed and permeate sides, pressure ratio between feed and permeate sides, pressure drop along the membrane modules, concentration of feed and recycle streams, concentration polarization effects, availability and cost of power, presence of other components in the feed, temperature, potential for fluctuations in feed flow and composition, and availability of suitable destinations for waste streams. Depending on the type of separation that is to be carried out, the interactions of at least some of these factors must be considered during process design, and an acceptable balance between them, consistent with other separation-specific considerations, must be obtained.

SUMMARY OF THE INVENTION

The invention is an improved process for treating gas mixtures containing at least an organic component and a second gas. The process separates the organic component from the second gas and provides discrete product streams enriched in each. The process may be configured so that either or both of these streams are produced in a purity sufficient for direct reuse in the upstream operation that produces the feed gas mixture.

The process includes a compression step combined with a membrane separation step.

Both the compression and the membrane separation are themselves performed in at least two sub-steps. The membrane separation steps are carried out using membranes that are selective in favor of the organic component over the second gas. The steps are integrated so that the organic-enriched permeates from the two membrane separation steps are recirculated separately to the two compressor stages.

In a basic embodiment, the process of the invention includes the following steps:

(a) passing a gas stream, comprising an organic component and a second gas, through a first compression stage and a second compression stage in series, thereby forming a compressed stream;

(b) withdrawing at least a portion of the organic component from the compressed stream as a withdrawn stream, thereby leaving a remaining stream;

(c) performing a first membrane separation step, comprising:
  (i) providing a first membrane having a first feed side and a first permeate side;
  (ii) passing the remaining stream over the first feed side under conditions in which there is a pressure drop between the first feed side and the first permeate side;

(iii) withdrawing from the first feed side a first residue stream enriched in the second gas compared with the remaining stream;

(iv) withdrawing from the first permeate side a first permeate stream enriched in the organic component compared with the remaining stream;

(d) performing a second membrane separation step, comprising:

(i) providing a second membrane having a second feed side and a second permeate side;

(ii) passing the first residue stream over the second feed side under conditions in which there is a pressure drop between the second feed side and the second permeate side;

(iii) withdrawing from the second feed side a second residue stream enriched in the second gas compared with the first residue stream;

(iv) withdrawing from the second permeate side a second permeate stream enriched in the organic component compared with the first residue stream;

(e) recirculating at least a portion of the first permeate stream to the second compression stage;

(f) recirculating at least a portion of the second permeate stream to the first compression stage.

The invention differs from prior art compression/membrane hybrid processes for separating organic components from other gases in that the permeate from the first membrane step is recirculated to the second compression stage and the permeate from the second membrane step is recirculated to the first compression stage. This method reduces the load on the first compression stage, thus often allowing the use of a smaller compressor package than if both permeates were recirculated together to the front of the compressor train inlet.

A further benefit is that a lower total compressor horsepower is required to achieve the same degree of separation and recovery as was previously achievable by recirculating the entirety of the membrane permeate to the front of the compressor train.

Unexpectedly, we have found that, for a given expenditure of compressor horsepower, the process of the invention can result in increased recovery of the second gas compared with the prior art process, without loss of purity of that gas. The second gas can often be recovered at high purity, such as higher than 95% purity, or even above.

Organic components that can be separated from other gases by the process of the invention include saturated hydrocarbons, unsaturated hydrocarbons and substituted hydrocarbons, such as halogenated hydrocarbons. Gases that may be separated from organic components by the process of the invention include nitrogen, methane and hydrogen.

The invention is useful in the treatment of gas streams from petrochemical manufacturing operations, in the separation of off-gas streams from refineries to recover hydrogen and/or LPG, and in the purification of natural gas to remove $C_{3+}$ hydrocarbons, for example. The invention is particularly useful for the separation of $C_{2+}$ hydrocarbons from nitrogen.

Such a hydrocarbon/nitrogen stream is typically found in polyolefin manufacturing plants, such as polyethylene and polypropylene plants. As part of the polyolefin manufacturing process, the raw polyolefin product is purged with large quantities of nitrogen to remove unreacted olefins. The resulting olefin/nitrogen off-gas stream can be treated by the process of the invention to recover both the nitrogen and the olefin in purities adequate for return to the manufacturing process.

Any types of compressors may be used to carry out the compression step, and additional compression stages may be included before, after or between the two stages to which the membrane permeates are recycled. The overall pressure change of the gas across the total compression step may be any value consistent with the other requirements of the process, but is preferably below about 1,000 psi.

The membrane separation steps are carried out using membranes selective in favor of the organic component over the second gas. Any membrane that provides such properties may be used. Rubbery polymeric membranes, particularly silicone rubber membranes, are preferred.

Particular parameters that are important in carrying out the process of the invention, and especially with respect to the first membrane separation step, are the organic component concentration in the feed to that step, the feed/permeate pressure ratio across that membrane separation step, and the selectivity of that membrane. As explained in the detailed description of the invention below, the process is more suitable for use, and performs better, if these parameters satisfy certain quantitative inequalities. Specifically, it is preferred that the pressure ratio across the first membrane separation step be more than about 3 and less than about 10. Further, it is preferred that the concentration of the organic component in the feed gas entering the first membrane separation step be above about 10%, or that the selectivity of that step for the organic component over the second gas be no more than about 20, or both.

Recycle of the membrane permeate streams to the compression steps creates a processing loop, from which at least two separated gas streams, either or both of which may be the desired products of the process, are withdrawn. One of these streams is the organic-depleted, second-gas-rich stream, which emerges as a residue stream from the membrane separation steps. The process may often be configured to produce this stream at high second-gas purity, such as 95% purity or above. The other stream is the organic-enriched, second-gas-depleted stream, which may be withdrawn at any convenient point in the processing loop, but typically is taken between the last compression and the first membrane separation steps. This gas may simply be withdrawn as a purge. More typically and preferably, the process includes a cooling or other recovery step between the compression steps and the membrane separation steps from which the organic component is removed at higher purity than its concentration in the loop.

It is an object of the invention to provide an energy- and cost-efficient process for separating gas mixtures containing an organic component and a second gas.

It is an object of the invention to provide an improved process for treating off-gas streams from petrochemical manufacturing processes.

Additional objects and advantages will be apparent from the description of the invention to those skilled in the art.

It is to be understood that the above summary and the following detailed description are intended to explain and illustrate the invention without restricting its scope.

DETAILED DESCRIPTION OF THE INVENTION

Figure 1:
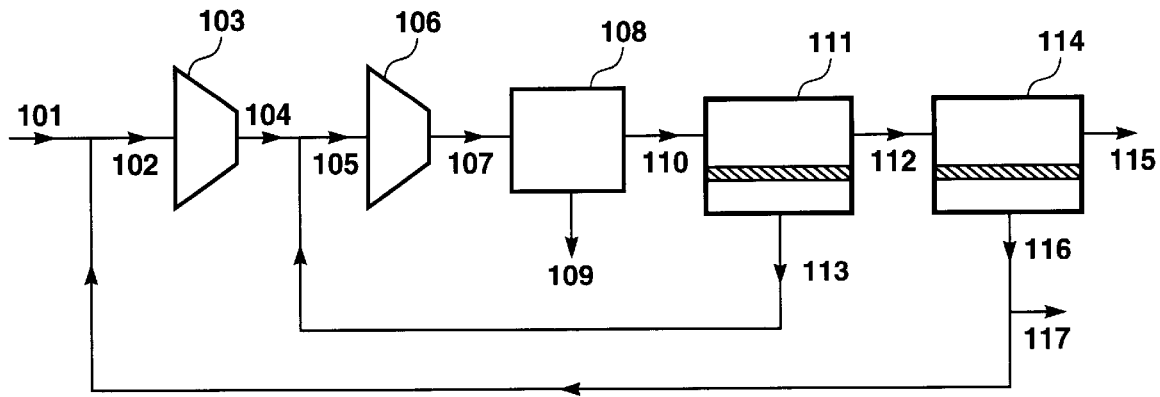
FIG. 1 is a schematic drawing showing a basic embodiment of the invention.

The terms gas and vapor are used interchangeably herein.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbons means $C_1$–$C_6$ hydrocarbons.

The term heavier hydrocarbons means $C_{3+}$ hydrocarbons.

The term hydrocarbon includes substituted hydrocarbons.

The term two-step as applied to membrane separation means a separation in which the residue stream from one membrane separation step passes as feed to a second membrane separation step.

Percentages herein are by volume unless otherwise stated.

The invention is an improved process for treating gas streams from petrochemical, refinery, natural gas and the like operations. The invention separates a stream containing an organic component and a second gas into at least two product streams, one enriched in the gas, the other enriched in the organic.

The process can be applied to any gas stream containing such a mix of components. The process is of particular value in separating components of significantly different condensability, or boiling point. The more condensable organic component generally has a boiling point above about –100° C., and often much higher, such as above –50° C. The second component may be an inorganic gas, such as a permanent gas, or itself may be a second organic component of lower boiling point than the first organic component. The second component generally has a boiling point below about –50° C., and more usually below –100° C.

Examples of organic components that may be separated as the more condensable component include, but are not limited to: ethylene (bp –104° C.), ethane (bp –89° C.), propylene (bp –47° C.), propane (bp –42° C.), n-butane (bp –0.5° C.), iso-butane (bp –12° C.), butylene (bp –7° C.), and fluorinated and perfluorinated hydrocarbons, for example $CHF_3$ (bp –82° C.).

Examples of gases with lower boiling points that can be separated from more condensable organic components by the processes of the invention include, but are not limited to, ethane, ethylene, methane (bp –161° C.), oxygen (bp –183° C.), argon (bp –186° C.), nitrogen (bp –196° C.), helium (bp –269° C.) and hydrogen (bp –253° C.).

Streams that may be treated by the process of the invention include, but are not limited to, streams from unit operations in petrochemical plants, refineries and natural gas fields. Some representative specific separations for which the processes of the invention are suited are given in Table 1.

TABLE 1

| Process producing gas stream to be treated | Higher-boiling point component(s) of stream and boiling point (° C.) | | Lower-boiling point component(s) of stream and boiling point (° C.) | |
|---|---|---|---|---|
| Polypropylene resin purging | Propylene | –47 | Nitrogen | –196 |
| Polyethylene resin purging | Ethylene | –104 | Nitrogen | –196 |
| | i-Butane | –12 | | |
| Polyvinyl chloride reactor purging | Vinyl chloride | –13 | Nitrogen | –196 |
| Steam cracking | $C_{2+}$ hydrocarbons | | Hydrogen | –253 |
| | | | Methane | –161 |
| Natural gas liquids (NGL) recovery | Propane | –42 | Methane | –161 |
| | n-Butane | –0.5 | | |
| | $C_{5+}$ components | >20 | | |
| Catalytic reforming of hydrocarbons | $C_{2+}$ hydrocarbons | | Hydrogen | –253 |
| | | | Methane | –161 |
| Catalytic cracking of hydrocarbons | $C_{2+}$ hydrocarbons | | Hydrogen | –253 |
| | | | Methane | –161 |
| Refinery saturated gas plant feed | $C_{3+}$ hydrocarbons | >–42 | Hydrogen | –253 |
| | | | Methane | –161 |

The first application of our process that we discovered is in the treatment of vent streams from polyolefin manufacturing plants. In a typical propylene or ethylene polymerization process, the raw polymer product, which is usually in powder form, contains significant amounts of unreacted monomer, and may contain solvents, catalysts, stabilizers, other hydrocarbons or any other materials, depending on the process used. To remove these contaminants, the raw polymer is passed to large bins, where nitrogen is used to purge them out. The vent gas from this step may contain 80–90% nitrogen, the remainder being $C_2$ and/or $C_3$ monomer, other hydrocarbons, etc. If this vent gas is flared, monomer with a potentially high value is lost. Even if the stream is chilled to very low temperatures, propylene and ethylene recovery is poor. The process of the invention offers a better alternative. For example, from purge streams containing about 75% nitrogen/25% hydrocarbon, the process can produce a higher-boiling point component (hydrocarbon) product stream containing essentially no nitrogen, and a lower-boiling point component (nitrogen) product stream containing 95+% nitrogen.

The process of the invention is also useful for the recovery of NGL and LPG from natural gas or refinery processing off-gas streams, which are often simply passed to the plant fuel header. Streams passed to the fuel header represent lost products, as the streams are usually more valuable when separated into their individual components. By using the process of the invention, these individual components can be recovered, and the volume of the fuel gas stream reduced, thus providing debottlenecking capability in plants where fuel gas generation is at capacity.

In a basic aspect, the invention includes two unit operations, a compression step combined with a membrane separation step. Both the compression and the membrane separation are themselves performed in at least two substeps.

The membrane separation steps are carried out using membranes that are selective in favor of the organic component over the second gas.

The steps are integrated so that the organic-enriched permeates from the two membrane separation steps are recirculated separately to the two compressor stages.

The invention in its basic aspect is shown schematically in FIG. 1. It will be appreciated by those of skill in the art that this and the other figures described below are very simple schematic diagrams, intended to make clear the key aspects of the invention, and that an actual process train will usually include many additional components of a standard type, such as heaters, chillers, phase separators, pumps, blowers, other types of separation and/or fractionation equipment, valves, switches, controllers, pressure-, temperature-, level- and flow-measuring devices and the like. Referring to this figure, feed stream, 101, contains at least the organic component and the second gas to be separated, and frequently is a multicomponent mix containing the two principal components to be separated, but also lesser amounts of other components, such as light hydrocarbons and/or inert gases. This stream may be at atmospheric pressure, or above or below atmospheric pressure, depending on its source. Stream 101 is mixed with return stream 116 to form stream 102, which represents the intake gases to the compression train. FIG. 1 shows a compression train comprising two compression stages, 103 and 106, although more stages may be used as desired. The compressors used in each stage may be of any convenient type, such as centrifugal, screw, reciprocating or liquid ring, based on considerations of outlet pressure needed, gas flow rate and composition, flammability concerns, and like issues familiar to those of skill in the art. The same or different types of compressors may be used in each stage. FIG. 1 indicates two discrete compressors. As an alternative, it is also possible to use a single compressor adapted to accept multiple intakes at different pressures.

Stream 102 is introduced into first compression stage 103 and emerges as compressed stream 104. The compression train may optionally be equipped with interstage coolers and/or interstage receivers to collect additional liquids that may be condensed in the train. For simplicity, however, it is assumed in the embodiment shown in FIG. 1 that no liquid formation takes place after the first compression step, and that compressed stream 104, after cooling if desired, is mixed with return stream 113 to form stream 105, which represents the intake gases to second compression stage 106.

Typically, but not necessarily, each compression stage raises the pressure of the gas stream between about 3-fold and 10-fold. As representative examples, if stream 101 is at 50 psia, it may be compressed to 200 psia in compression stage 103 and then to 700 psia in compression stage 106. If stream 101 is at 150 psia, it may be compressed to 750 psia in compression stage 103 and then to 1,500 psia in compression stage 106. If stream 101 is at 10 psia, it may be compressed to 60 psia in compression stage 103 and then to 200 psia in compression stage 106. In each case, additional compression stages can be used as desired to achieve greater degrees of compression. For most applications of the process, it is neither necessary not desirable to compress the feed gas to very high pressures, because the overall separation performance of the process does not rely on the parameters of the compression step alone. Therefore, it is preferred that the pressure to which the gas stream is raised by the total compression train be no more than about 1,000 psia.

The fully compressed gas stream, 107, is passed to organic component withdrawal or recovery step, 108. Various methods may be used to remove the organic component. The simplest is simply to split stream 107 into two portions, stream 110, which passes on to the membrane separation steps, and stream 109, which is withdrawn from the process, without adjusting the composition in any way. Since this method provides no additional separation beyond what is achieved by the membrane separation steps, it is less preferred, especially if the organic component stream is a desired product stream, rather than merely a waste stream of the process. More preferably, advantage is taken of the high pressure provided by the compression steps to recover the organic component in a more purified form. In this case, recovery techniques known in the art, such as, but not limited to, cooling/condensation, absorption, adsorption or additional membrane separation may be used. For example, step 108 may involve adsorption, such as pressure swing adsorption (PSA). PSA systems usually comprise a series of beds of a zeolite or similar material that will selectively sorb one or more components of gas mixture 107. In the present invention, the beds preferentially sorb one or more organic components and reject the second gas or gases as stream 110. The beds are connected in such a way that each bed can be switched periodically from adsorption mode to regeneration mode to recover the sorbed components as stream 109. If step 108 involves absorption, a scrubbing tower or column may conveniently be used. For example, stream 107 is introduced into the base of the tower and rises countercurrently against a descending scrubbing liquid, into which the organic components of the gas partition preferentially, leaving overhead stream 110. The organic component maybe withdrawn in sorbed form as stream 109 or the liquid may first be regenerated so that stream 109 represents the purified organic product. If step 108 involves membrane separation, the membranes used should be organic-selective, so as to retain the organic-depleted stream 110 at high pressure for the subsequent membrane separation steps 111 and 114 in the processing loop. In this case stream 109 is the permeate stream from the membrane recovery step.

A preferred recovery method is condensation, achieved by cooling stream 107 below the dewpoint of the organic component to form an organic liquid phase which can be separated and collected as stream 109. Cooling may be performed in any manner, including, but not limited to, simple air aftercooling of the compressor outlet gases, heat exchange against other streams, such as the streams entering or leaving the membrane unit, chilling by external refrigerants, and any combinations of these. Such methods are familiar to those of skill in the art. It is desirable to avoid cooling to very low temperatures, by which we mean temperatures lower than about −40° C. Reaching these adds to the cost and complexity of the process. In addition, the lower the temperature to which the compressed gas is cooled, the lower the concentration of the condensable component remaining in the gas phase 110. For reasons discussed in more detail below, the process of the invention is less well suited to operating under conditions of low concentration feed to the membrane separation steps.

The temperature to which the gas is cooled in step 108 should, therefore, be above about −40° C., more preferably above 0° C. and most preferably ambient temperature, for example 20° C. or 35° C.

The liquid and gas phases that are formed by compression/cooling are separated to yield organic liquid stream, 109 and uncondensed stream 110. The organic liquid stream 109 is one of the product streams of the process, and is discharged from the process and sent to any destination appropriate to its composition and the application for which the process is being used. For example, if the stream being treated is the off-gas stream from the purge bin of a polyolefin manufacturing plant, stream 109 contains olefin monomer and/or the solvent used in the polymerization step, and can be returned to the reactor, after additional purification steps if necessary.

Other examples of condensable organic products of value that may be recovered in stream 109 include NGL from natural gas processing and LPG from refinery off-gas processing.

Commonly, although not necessarily, it is beneficial to stabilize the liquid product by lowering the pressure to flash off dissolved light components before sending the liquid to its destination. The light gases from the overhead of the flash phase separator may be recirculated to the front of the process at any convenient point.

After the recovery step, uncondensed or remaining stream 110 passes as feed to first membrane separation step 111. The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas. Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{3+}$ organic molecules. For rubbery or elastomeric polymers, the difference in size is much less critical, because the polymer chains can be flexed, and sorption or solubility effects generally dominate the permeability. Elastomeric materials, therefore, tend to permeate larger, condensable molecules faster than small, low-boiling molecules. Thus, most rubbery materials are selective in favor of all $C_{3+}$ hydrocarbons over low-boiling point gases. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, and thermoplastic polyolefin elastomers. However, for the smallest, least condensable hydrocarbons, and the smallest, lowest-boiling gas, hydrogen, most rubbery polymers tend to be selective in favor of hydrogen, because of the relative ease with which the hydrogen molecule can diffuse through most materials. For such separations, many rubbery polymer membranes are unsuitable, and silicone rubber, which is selective even for methane over hydrogen, or another rubber of similar properties, should be used to make the membranes. In general, silicone rubber membranes, which have a history of good performance in separating organic components from gas streams, are preferred for all separations. As a less preferred alternative, super-glassy materials, which are also known to be selective for more condensable over less condensable components in a gas mixture, may be used. Such materials and membranes made from them are described in U.S. Pat. Nos. 5,281,255 and 5,707,423, for example.

The membrane may take any convenient form known in the art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on. The membranes may be manufactured as flat sheets or as fibers and housed in any convenient module form, including spiral-wound modules, plate-and-frame modules and potted hollow-fiber modules.

The making of all these types of membranes and modules is well known in the art. Flat-sheet membranes in spiral-wound modules are our most preferred choice. Since conventional polymeric materials are preferred for the membranes, they are relatively easy and inexpensive to prepare and to house in modules, compared with other types of membranes that might be used as organic-selective membranes, such as finely microporous inorganic membranes, including adsorbent carbon membranes, pyrolysed carbon membranes and ceramic membranes.

Whatever their composition and structure, the membranes should preferably have a selectivity for the faster permeating component over the other component of at least 3, more preferably at least 5. Selectivities higher than about 15 or 20 are neither needed nor preferred, as discussed in more detail below.

The transmembrane pressure-normalized flux of the organic component should be at least about 1 gpu ($1 \times 10^{-6}$ $cm^3$(STP)/$cm^2$ .s.cHg), more preferably at least about 10 gpu and most preferably at least about 100 gpu. To achieve a high transmembrane flux, the selective layer responsible for the separation properties should be thin, preferably, but not necessarily, no more than 30 $\mu$m thick, more preferably no more than 20 $\mu$m thick, and most preferably no more than about 10 $\mu$m thick. Although composite membranes with silicone rubber selective layers of just 1 or 2 $\mu$m thick can be made, extremely thin membranes, such as less than about 5 $\mu$m thick, are not preferred, since the resulting extremely high fluxes may give rise to a permeant-depleted boundary layer at the membrane surface on the feed side, and hence to overall diminished separation performance.

A driving force for transmembrane permeation is provided by a pressure difference between the feed and permeate sides of the membrane. This driving force is provided by compression steps 103 and 106, from which membrane feed stream 110 emerges at an elevated pressure, typically of a few hundred psi. The pressure on the permeate side is determined by the pressure on the suction side of compression stage 106.

By selectively removing the organic component, membrane separation step 111 results in a first residue stream, 112, that is enriched in the second gas compared with the membrane feed stream, 110, and a first permeate stream, 113, that is enriched in the organic component compared with the membrane feed stream 110. The permeate stream is recirculated to the intake side of the second compression stage as shown.

First residue stream 112 is passed as feed to second membrane separation step 114. The membranes used in this step, although also selective for the organic component over the second gas, may be the same as or different from the membranes used in the first step. For example, they may provide a higher selectivity than the membranes of the first step. The driving force for transmembrane permeation in this step is provided by the pressure difference between feed stream 112 and second permeate stream 116. Stream 112 will normally be at essentially the same pressure as stream 110, subject only to any small pressure drop that occurs along the length of the membrane modules in step 111. In a properly designed gas separation system, this drop should be no more than a few psi. The pressure on the second permeate side is determined by the pressure on the suction side of compression stage 103.

By selectively removing the organic component, second membrane separation step 114 results in a second residue stream, 115, that is further enriched in the second gas. This is the other product stream of the process, and is discharged from the process and sent to any destination appropriate to its composition and the application for which the process is being used. For example, if the stream being treated is the off-gas stream from the purge bin of a polyolefin manufacturing plant, then the second gas is usually nitrogen, and the second residue product stream 115 is a nitrogen-rich stream. As shown in the examples below, the process can deliver this stream at comparatively high purity, such as at least 90% nitrogen, at least 95% nitrogen, or above. This gas is often, therefore, of sufficient purity to be returned directly for reuse as polymer purging gas. If further treatment of the gas is desired before it is reused, it may be sent to additional membrane separation steps, or to any other appropriate treatment.

As a second example, if the stream being treated is natural gas, product residue stream 115 is the methane-rich stream, typically containing 95% methane or more, which can be sent to the natural gas pipeline, or to further treatment if desired.

One particular advantage of the present process is that it provides unexpectedly improved recovery of the second gas, compared with a prior art condensation/membrane separation combination process. The increase in recovery of the second gas is substantial, such as 5%, 10%, 20% or more additional recovery. For example, in a prior art polyolefin manufacturing process, the nitrogen recovery in the membrane residue stream at a nitrogen purity of 95% could be as low as 50% or less. The process of the invention, without compromising nitrogen purity or organic component recovery or purity, and without requiring a larger compressor size, can increase nitrogen recovery to 60%, 70% or above.

The second membrane separation step also produces a second permeate stream, 116, which is recirculated to the intake side of the first compression stage as shown.

It is frequently the case that the stream to be treated by the process of the invention contains additional organic and/or inorganic components besides the organic component of interest and the second gas. These components may build up in the loop created by returning the permeate streams, to the extent that they adversely contaminate the product streams. Optionally, to avoid such contaminant build up, a purge stream may be withdrawn from the process as indicated by stream 117.

A number of factors have an effect on the overall process performance. Particular parameters that are important in carrying out the process of the invention, and especially with respect to the first membrane separation step, are (i) the organic component concentration of stream 110, which is the feed to that step, (ii) the feed/permeate pressure ratio across that membrane separation step, and (iii) the selectivity of that membrane. The relationship between these parameters that can be achieved in a specific separation application determines the suitability of the process for use in that application, as well as affecting the process results.

If the membranes used in the first membrane separation step have a selectivity, $\alpha$, for the organic component over the second gas, as measured with gas mixtures, and the first membrane separation step operates at a pressure ratio (total feed pressure/total permeate pressure), $\phi$, then, preferably, $\alpha/\phi$ is less than about 5.

This preference can be understood when the energy and financial costs of the process are considered. The major portions of both the capital costs of the equipment and the operating costs of the process arise from the compression/cooling operation rather than the membrane separation operation. Thus, the more the raw incoming gas is compressed, the larger and costlier is the compressor train, and the greater is the compression horsepower required to compress the gas. The capabilities of the process are, therefore, often limited by the capabilities of the compression step.

As mentioned earlier, each compression stage typically raises the pressure of the gas at least about 3-fold and less than about 10-fold. Thus, the pressure ratio of the first membrane separation step, which is determined by the pressure ratio exhaust:intake of the second compression stage, is also typically at least about 3 and below about 10, with 4 or 5 being representative typical values.

The mathematical relationship between pressure ratio and selectivity is a complicated expression. (This expression is derived, for example, in chapter 8 of *Membrane Technology and Applications*, R. W. Baker, McGraw Hill, 2000) This expression predicts three regions of performance, expressed as the permeate concentration of a permeating component, for a membrane separation process.

If the numerical value of the pressure ratio, $\phi$, is much larger (such as an order of magnitude or more larger) than the numerical value of the selectivity, $\alpha$, then the process operates in the selectivity-limited region, and the permeate concentration is essentially independent of the pressure ratio and is determined by the selectivity. In this region, a membrane separation process can take advantage of the full intrinsic separating power of the membrane, and, assuming a given feed composition, the higher the selectivity, the better the separation performance will be. In the present process, however, the pressure ratio that can be provided across the first membrane separation step is the same as the exhaust/intake pressure ratio across a single compression stage, and is generally on the order of 10 or less. It is seldom possible, therefore, to operate this membrane step entirely in the selectivity-limited region.

At the other extreme, if the numerical value of the pressure ratio is much smaller than the selectivity, then the process operates in the pressure-ratio-limited region, and the permeate concentration is essentially independent of the membrane selectivity and is determined by the pressure ratio. In other words, if membranes with a selectivity of, for example, 30, 40 or 50 are available, then using those membranes in a step that can provide a pressure ratio of only 3, 4 or 5 means that the separation performance obtained in that step will be very poor compared with what might be obtained with a pressure ratio of 20 or above. In this case, better results may be obtained by conventional processes and the process of the invention is not preferred.

In the third region, where the pressure ratio and the selectivity are of about the same order of magnitude, the separation performance is affected by both the pressure ratio and the selectivity. In other words, although the pressure ratio influences performance to some extent, the process is still able to benefit from the selectivity of the membrane. This is the region where the process of the invention is expected to be most useful and can provide valuable results.

For example, for a first membrane separation step with a typical pressure ratio of about 4, the performance of that step will be substantially pressure-ratio limited for separations that provide a selectivity for the organic component over the second gas of about 20 or more. On the other hand, if available selectivity is 10 or less, selectivity and pressure ratio are comparable, the step can operate in the third region and the adoption of a step with low pressure ratio, as called for by the process, will be beneficial to energy consumption and/or productivity, without compromising selectivity.

An additional result of these considerations, therefore, is that the process is preferred for use where available membrane selectivity is below about 30, or, depending on the available pressure ratio, selectivity is lower still, such as below 25, below 20, or below 15.

The relationship between the membrane feed/permeate pressure ratio and the organic component concentration of the membrane feed stream is also important. If the organic component is present in the feed stream, 110, to the first membrane separation step at a concentration C%, then, preferably, $100/C<5\phi$, and more preferably $100/C<3\phi$.

This preference arises from consideration of the driving force for permeation of the organic component. A flow of that component can only occur if its partial pressure on the feed side is greater than its partial pressure on the permeate side. That is:

C×(total feed pressure)>(organic permeate conc.)×(total permeate pressure).

Or, rearranging:

(total feed pressure)/(total permeate pressure)>(organic permeate conc.)/C.

i.e.

pressure ratio>enrichment.

That is, the enrichment obtained by a membrane separation step can never exceed the pressure ratio $\phi$. Of course, it is often substantially less than the pressure ratio, because of other factors in the separation, but it can never be more.

Since the organic component concentration on the permeate side can also never be higher than 100%, it follows that the process performance may again be limited by the pressure ratio on the one hand and by the maximum enrichment (100/C) on the other.

If the feed organic concentration is 5%, for example, the maximum enrichment to take the permeate concentration to 100% is 20-fold. Since the enrichment must be less than the pressure ratio, however, the process will be pressure-ratio-limited if the pressure ratio is less than 20, and concentration-limited if the pressure ratio is greater than 20. Similarly, if the feed organic concentration is 33%, the maximum enrichment is 3-fold, and the process will be pressure-ratio limited if the pressure ratio is less than 3, and concentration-limited if the pressure-ratio is greater than 3.

As discussed above, the available pressure ratio for the first membrane separation step is generally below about 10, and typically around 5. It follows that operating the condensation or other recovery step under conditions that result in a very low concentration of the organic component in the remaining or non-condensed stream, such as about 5% or less is not efficient, because the first membrane separation step will only be able to concentrate this stream up to no more than 5×5%, or 25% (if pressure ratio is 5), or no more than 10×5%, 50% (if pressure ratio is 10). Alternatively, this argument means that the process of the invention is not well suited to applications in which the organic recovery step results in an off-gas stream of low organic concentration, and that such streams are often better treated by conventional methods.

We believe, therefore, that the preferred operating range for the process is where the organic component concentration in the feed is such that the maximum possible enrichment (100/C) is not very much greater than the pressure ratio, preferably not more than 5 times, and most preferably not more than 2 or 3 times, the pressure ratio. This avoids adversely affecting an otherwise potentially large enrichment by restriction to a low pressure ratio.

An additional result of these considerations, therefore, is that it is preferred that the concentration of the organic component in the feed gas entering the first membrane separation step, that is, the off-gas from the condensation step, be above about 10%, and yet more preferably above about 20%.

Turning to the second membrane separation step, 114, these issues are of less concern because the pressure ratio available for that step is the ratio across the whole compression train, and thus is usually at least 10, and may be 20, 30 or higher. Thus, it is much easier to operate this step outside the pressure-ratio limited region, both with respect to membrane selectivity and with respect to maximum enrichment of the permeate. Indeed, if membranes of differing selectivities for the organic component over the second gas are available, it is possible and advantageous to use them both in the process of the invention. The first step may be equipped with the membranes of lower selectivity, to obtain a first separation at relatively low energy consumption. The separation may then be completed by using the membranes of higher selectivity in the second step. Since membranes of lower selectivity often provide higher flux than more selective membranes, the process also enables the use of high flux membranes for at least part of the membrane separation, thereby saving on membrane area required.

The invention is now further described by the following examples, which are intended to be illustrative of the invention, but are not intended to limit the scope or underlying principles in any way.

EXAMPLE 1

A computer calculation was performed to evaluate the performance of the process of the invention in treating an off-gas stream from a polyethylene manufacturing purge bin. The process was assumed to use iso-butane as a solvent and to produce about 2,000 scfm of off-gas from the purge bins, at 43° C. and 18 psia, with the following mol% composition:

| | |
|---|---|
| Hydrogen | 1.0 |
| Nitrogen | 15.1 |
| Methane | 0.1 |
| Ethylene | 5.8 |
| Ethane | 1.5 |
| Propane | 0.1 |
| iso-Butane | 73.6 |
| n-Butane | 2.4 |
| $C_{5+}$ | 0.3 |
| Water | 0.1. |

Two calculations, the first representing a prior art process, the second representing a typical process of the invention, were performed.

(a) Not in Accordance with the Invention

Figure 2:
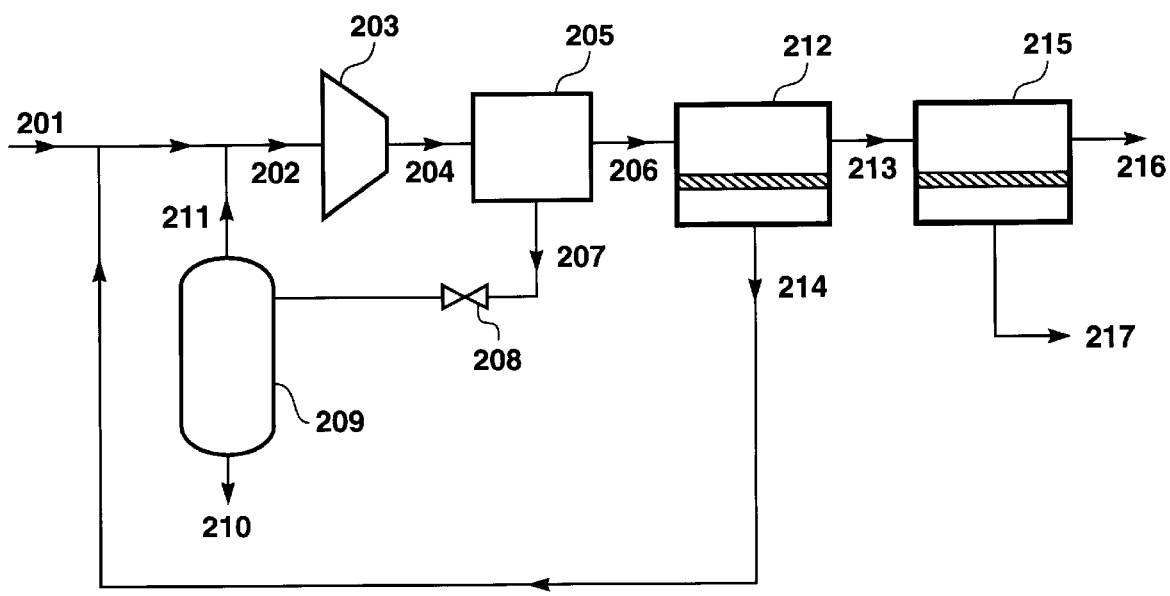
FIG. 2 is a schematic drawing of a process with a single compression stage not in accordance with the invention.

The first calculation, not in accordance with the invention, assumed that the purge gas was treated by the prior art process shown in FIG. 2 to recover iso-butane solvent, ethylene and nitrogen for reuse. Referring to this figure, raw purge bin off-gas stream 201 is mixed with return streams 214 and 211 to form stream 202, which is introduced into compression stage 203 and emerges as compressed stream 204 at 288 psia. Stream 204 is then cooled and separated in cooling/condensation stage 205 to form butane-rich organic condensate stream 207 and nitrogen-enriched non-condensed stream 206. The organic condensate stream is reduced in pressure through valve 208 and passes into flash tank 209. The light overhead gas, stream 211, that has been flashed off is rich in ethylene and nitrogen, and is recirculated to the compression stage. The final condensate product, stream 210, is removed from the bottom of the flash tank. The non-condensed stream, 206, passes into first membrane separation step, 212, assumed to be equipped with silicone rubber membranes, where it is separated into further nitrogen-enriched residue stream 213 and organic-enriched permeate stream 214. The permeate stream is recirculated to the compressor intake. The residue stream passes to second membrane separation step, 215, also equipped with silicone rubber membranes, where it is separated into second residue stream 216, containing 96% nitrogen, for reuse in the purge bins, and permeate stream 217. In this case, permeate stream 217 is not recirculated, but is discharged from the process to remove contaminants, such as hydrogen, methane and ethane, which would otherwise build up in the process loop and contaminate the products.

The results of the calculation are shown in Table 2.

TABLE 2

(Not in accordance with the invention)

| Stream | 201 | 216 | 217 | 210 |
|---|---|---|---|---|
| Flow (lbmol/h) | 332 | 26 | 29.8 | 276 |
| Mass flow (lb/h) | 16,856 | 705 | 774 | 15,377 |
| Temp. (° C.) | 43 | 10 | 13 | 23 |
| Pressure (psia) | 18 | 277 | 25 | 107 |
| Component (mol %): | | | | |
| Hydrogen | 1 | 3.5 | 7.8 | — |
| Nitrogen | 15.1 | 95.9 | 82.5 | 0.2 |
| Methane | 0.1 | 0.2 | 0.8 | — |
| C2 | 7.5 | 0.4 | 8.7 | 7.8 |
| C3 | 0.1 | — | — | 0.1 |
| Butanes | 75.7 | — | — | 91.3 |
| C5+ | 0.3 | — | — | 0.4 |
| Water | 0.1 | — | — | 0.2 |
| Component lb/h) | | | | |
| Hydrogen | 6.7 | 1.8 | 4.7 | 0.2 |
| Nitrogen | 1,403 | 699 | 689 | 14.6 |
| Methane | 5.6 | 0.7 | 3.7 | 1.1 |
| C2 | 689 | 3.3 | 73.6 | 612 |
| (ethylene) | (540) | | | (474) |
| C3 | 11.7 | — | 0.1 | 11.6 |
| Butanes | 14,639 | — | 3.2 | 14,636 |
| (iso-butane) | (14,175) | | | (14,172) |
| C5+ | 93.4 | — | — | 93.4 |
| Water | 7.6 | — | 0.1 | 7.6 |

— = <0.1

Membrane Area=260 m$^2$
Theoretical compressor horsepower=808 hp
Compressor inlet suction flow rate 3,243 acfm As can be seen, the process produces 26 lbmol/h, or about 165 scfm, of nitrogen-rich gas with a nitrogen content of about 96%. This means that the nitrogen recovery is 699 lb/h, out of 1,403 lb/h in the feed, or about 50%.

The process also produces a liquid organic stream of 15,377 lb/h, containing 14,172 lb/h of iso-butane, representing 99.9+% recovery, and 474 lb/h of ethylene, representing 88% recovery.

(b) Process of the Invention

Figure 3:
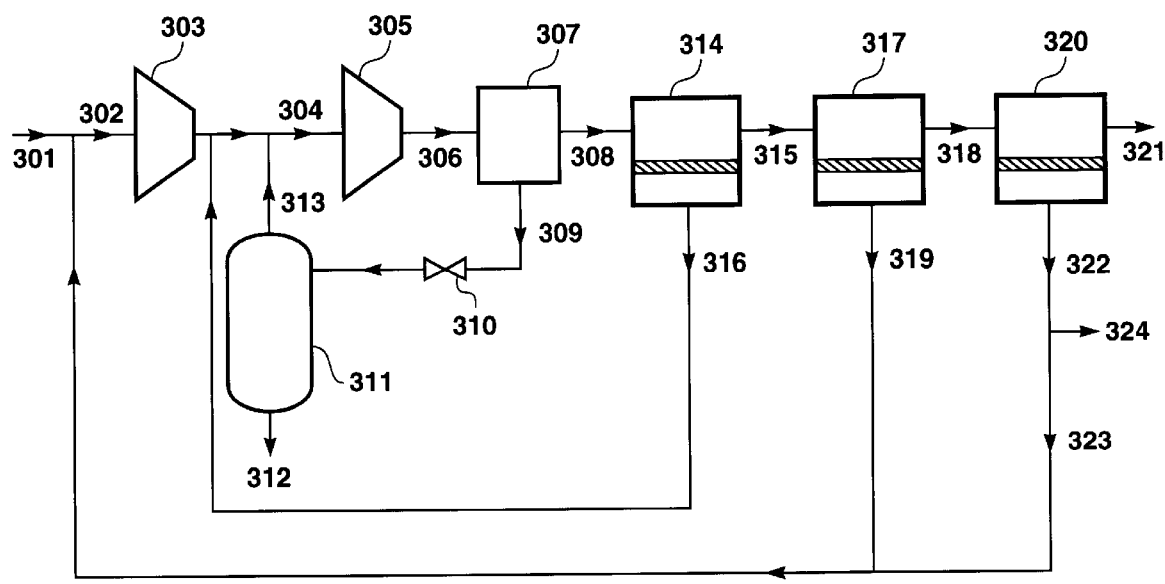
FIG. 3 is a schematic drawing showing an embodiment of the invention in which the second membrane separation step is divided into two sub-steps to facilitate purging of contaminants, and in which the organic condensate is subjected to additional treatment by pressure reduction.

The second calculation assumed that the same volume of off-gas, of the same composition, was treated according to the process of the invention, as shown in FIG. 3. The process was assumed to use two compression stages, 303 and 305, and two membrane separation steps, the first step, 314, returning permeate to the second compression stage, and the second step being divided into two sub-steps, 317 and 320. The second step permeates were assumed to be combined and returned to the first compression step, except that a small purge stream to remove contaminants was assumed to be removed from the third permeate stream. All of the membranes used in the process were again assumed to be silicone rubber membranes. Referring to FIG. 3, raw purge bin off-gas stream 301 is mixed with return stream 319 to form stream 302, which is introduced into first compression stage 303, which raises the gas pressure to 65 psia. The compressed gas from this stage is mixed with return streams 313 and 316, to form stream 304, and introduced into second compression stage 305, where the gas pressure is raised to 288 psia. Compressed stream 306 is then cooled and separated in cooling/condensation stage 307 to form butane-rich organic condensate stream 309 and nitrogen-enriched non-condensed stream 308. The organic condensate stream is reduced in pressure through valve 310 and passes into flash tank 311. The light overhead gas, stream 313, that has been flashed off is rich in ethylene and nitrogen, and is recirculated to the second compression stage. The final condensate product, stream 312, is removed from the bottom of the flash tank. The non-condensed stream 308 passes into first membrane separation step 314, where it is separated into further nitrogen-enriched residue stream 315 and organic-enriched permeate stream 316. The permeate stream is recirculated to the compressor intake of the second compression stage. The residue stream passes to second membrane separation sub-step, 317, where it is separated into second residue stream 318, and second permeate stream, 319, which is recirculated to the compressor intake of first compression stage 303. The second residue stream, 318, is passed to second membrane separation sub-step, 320, where it is separated into third residue stream, 321, which is the nitrogen-rich product stream, and third permeate stream, 322. The third permeate stream is split into stream 323, which is returned to the compressor intake of first compression stage 303, and stream 324 which is purged from the process to remove contaminants. The results of the calculation are shown in Table 3.

TABLE 3

Nitrogen, iso-butane and ethylene recovery from polyethylene purge bin off-gas.

| Stream | 301 | 321 | 324 | 312 |
|---|---|---|---|---|
| Flow (lbmol/h) | 332 | 40.7 | 13.4 | 278 |
| Mass flow (lb/h) | 16,856 | 1,089 | 341 | 15,428 |
| Temp. (° C.) | 43 | 10 | 11 | 23 |
| Pressure (psia) | 18 | 267 | 25 | 113 |
| Component (mol %): | | | | |
| Hydrogen | 1 | 4.7 | 9.7 | 0.1 |
| Nitrogen | 15.1 | 94.6 | 83.3 | 0.2 |
| Methane | 0.1 | 0.3 | 1 | — |
| C2 | 7.5 | 0.5 | 5.9 | 8.3 |
| C3 | 0.1 | — | — | 0.1 |
| Butanes | 75.7 | — | 0.1 | 90.8 |
| C5+ | 0.3 | — | — | 0.4 |
| Water | 0.1 | — | — | 0.2 |
| Component lb/h) | | | | |
| Hydrogen | 6.7 | 3.8 | 2.6 | 0.3 |
| Nitrogen | 1,403 | 1,078 | 313 | 14.8 |
| Methane | 5.6 | 1.7 | 2.1 | 1.7 |
| C2 | 689 | 5.3 | 22.4 | 659 |
| (ethylene) | (540) | | | (513) |
| C3 | 11.7 | — | — | 11.7 |
| Butanes | 14,639 | — | 0.6 | 14,640 |

TABLE 3-continued

Nitrogen, iso-butane and ethylene recovery from polyethylene purge bin off-gas.

| (iso-butane) | (14,175) | — | — | (14,175) |
|---|---|---|---|---|
| C5+ | 93.4 | — | — | 93.3 |
| Water | 7.6 | — | — | 7.6 |

— = <0.1

Membrane Area=475 m$^2$
Theoretical compressor horsepower=983 hp
Compressor intake suction flow rate 3,069 acfm.

As can be seen, the process produces about 41 lbmol/h, or about 260 scfm, of nitrogen-rich gas with a nitrogen content of about 95%. This means that the nitrogen recovery is 1,078 lb/h, out of 1,403 lb/h in the feed, or about 77%. The process also produces a liquid organic stream of 15,428 lb/h, containing 14,175 lb/h of iso-butane, representing 100% recovery, and 513 lb/h of ethylene, representing 95% recovery.

A significant difference between the prior art process and the process of the invention is in the suction capacity required for the compressor train. In the prior art case, using a single compressor, the suction flow rate is 3,243 acfm. The process of the invention, on the other hand, requires a first stage suction capacity of only 3,069 acfm, a saving of over 5%.

EXAMPLE 2

A computer calculation was performed to evaluate the performance of the process of the invention in treating an off-gas stream from a polypropylene manufacturing purge bin. The process was assumed to use hexane as a solvent and to produce about 500 scfm of off-gas from the purge bins, at 90° C. and 16 psia, with the following mol% composition:

| | |
|---|---|
| Hydrogen | 3.3 |
| Nitrogen | 48.2 |
| Methane | 0.1 |
| Ethylene | 0.8 |
| Propane | 9.1 |
| Propylene | 32.7 |
| n-Hexane | 4.4 |
| Water | 0.1. |

Two calculations, the first representing a prior art process, the second representing a typical process of the invention, were performed.

(a) Not in Accordance with the Invention

Figure 4:
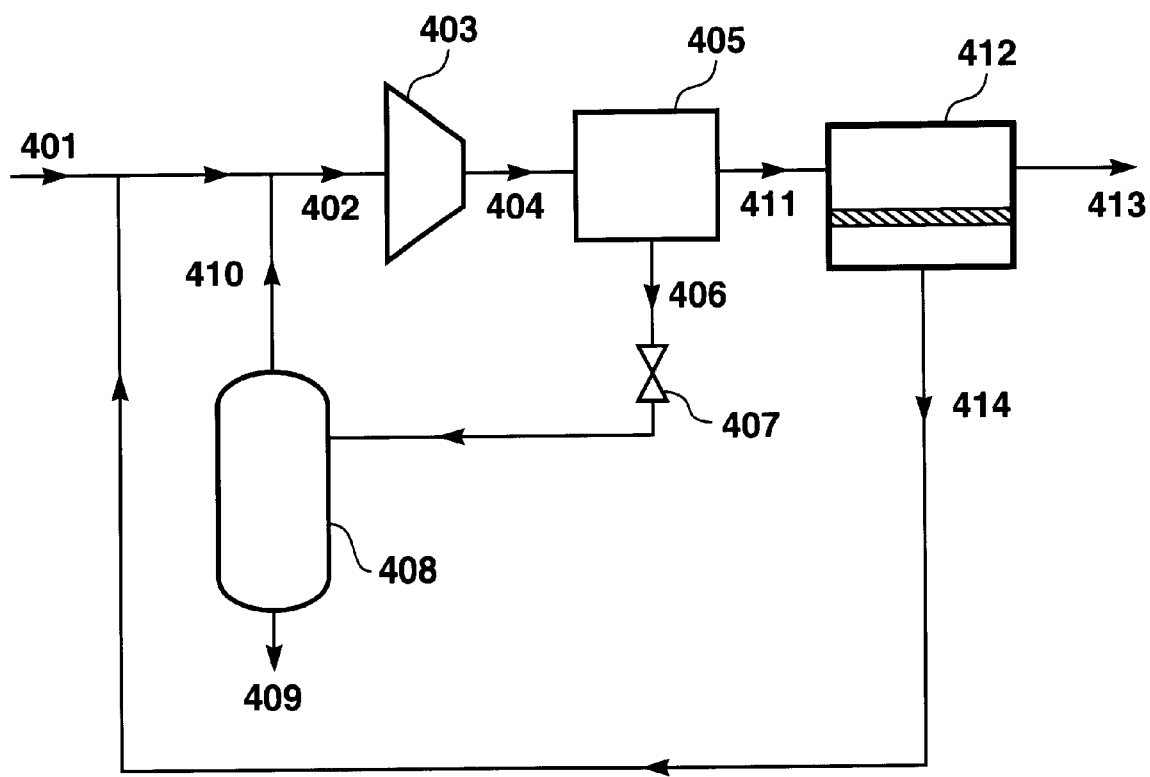
FIG. 4 is a schematic drawing of a process with a single compression stage and a single membrane separation step not in accordance with the invention.

The first calculation, not in accordance with the invention, assumed that the purge gas was treated by the prior art process shown in FIG. 4 to recover propylene and nitrogen for reuse. Referring to this figure, raw purge bin off-gas stream 401 is mixed with return streams 414 and 410 to form stream 402, which is introduced into compression stage 403 and emerges as compressed stream 404 at 288 psia. Stream 204 is then cooled and separated in cooling/condensation stage 405 to form propylene-rich organic condensate stream 406 and nitrogen-enriched non-condensed stream 411. The organic condensate stream is reduced in pressure through valve 407 and passes into flash tank 408. The light overhead gas, stream 410, that has been flashed off is rich in nitrogen, and is recirculated to the compression stage. The final condensate product, stream 409, is removed from the bottom of the flash tank. The non-condensed stream 411 passes into membrane separation step, 412, assumed to be equipped with silicone rubber membranes, where it is separated into nitrogen-rich product residue stream 413 and organic-enriched permeate stream 414. The permeate stream is recirculated to the compressor intake.

The results of the calculation are shown in Table 4.

TABLE 4

(not in accordance with the invention)

| Stream | 401 | 413 | 409 |
|---|---|---|---|
| Flow (kgmol/h) | 42.2 | 21.9 | 20.3 |
| Mass flow (kg/h) | 1,504 | 581 | 923 |
| Temp. (° C.) | 90 | -12 | 12 |
| Pressure (psia) | 16 | 278 | 170 |
| Component (mol %): | | | |
| Hydrogen | 3.3 | 6.3 | 0.1 |
| Nitrogen | 48.2 | 92.2 | 0.7 |
| Methane | 0.1 | 0.2 | — |
| Ethylene | 0.8 | 0.2 | 1.5 |
| Propylene | 32.7 | 0.8 | 67.1 |
| Propane | 9.1 | 0.2 | 18.8 |
| n-Hexane | 4.4 | — | 9.2 |
| Water | 1.3 | — | 2.7 |
| Component lb/h) | | | |
| Hydrogen | 2.8 | 2.8 | — |
| Nitrogen | 570 | 566 | 3.9 |
| Methane | 0.8 | 0.7 | 0.1 |
| Ethylene | 10 | 1.6 | 8.4 |
| Propylene | 580 | 7.4 | 573 |
| Propane | 170 | 1.9 | 168 |
| n-Hexane | 160 | — | 160 |
| Water | 10 | — | 10 |

— = <0.1

Membrane Area=180 m$^2$
Theoretical compressor horsepower=391 hp

As can be seen, the process separates the off gas into a condensate stream, containing 67% propylene, and a nitrogen stream, containing 92% nitrogen, for reuse in the process. The compressor horsepower requirement to carry out this separation is 391 hp.

(b) Process of the Invention

The second calculation assumed that the same volume of off-gas, of the same composition, was treated according to the process of the invention, as shown in FIG. 1. In addition, it was assumed that the organic condensate, stream 109, was reduced in pressure to flash off lighter components, and that the resulting flash gas was recirculated to the first compression stage, leaving a liquid product with a lower nitrogen content. All of the membranes used in the process were again assumed to be silicone rubber membranes.

The results of the calculation are shown in Table 5.

TABLE 5

Nitrogen and propylene recovery from polypropylene purge bin off-gas.

| Stream | 101 | 115 | 109* |
|---|---|---|---|
| Flow (kgmol/h) | 42.2 | 22.1 | 19.6 |
| Mass flow (kg/h) | 1,504 | 587 | 907 |
| Temp. (° C.) | 90 | -11 | 12 |
| Pressure (psia) | 16 | 272 | 170 |
| Component (mol %): | | | |
| Hydrogen | 3.2 | 6.2 | 0.1 |
| Nitrogen | 48.2 | 91.6 | 0.7 |

TABLE 5-continued

Nitrogen and propylene recovery from polypropylene purge bin off-gas.

| | | | |
|---|---|---|---|
| Methane | 0.1 | 0.2 | — |
| Ethylene | 0.8 | 0.3 | 1.4 |
| Propylene | 32.7 | 1.3 | 68.9 |
| Propane | 9.1 | 0.3 | 19.3 |
| n-Hexane | 4.4 | — | 9.5 |
| Water | 1.3 | — | 0.1 |
| Component lb/h) | | | |
| Hydrogen | 2.8 | 2.8 | — |
| Nitrogen | 570 | 566 | 3.9 |
| Methane | 0.8 | 0.7 | 0.1 |
| Ethylene | 10 | 2.1 | 7.9 |
| Propylene | 580 | 12.2 | 568 |
| Propane | 170 | 3.1 | 166 |
| n-Hexane | 160 | — | 160 |
| Water | 10 | — | 0.2 |

— = <0.1

After depressurization to remove nitrogen
Membrane Area=200 m$^2$
Theoretical compressor horsepower=336 hp As can be seen, the process of the invention uses more membrane area, but significantly less compressor horsepower, 336 theoretical hp versus 391 theoretical hp, or only 85% of the power of the prior art process, to achieve the same separation. Furthermore, comparing the total volume flows of stream 402 (113 kgmol/h) and stream 102 (71 kgmol/h), it may be seen that the intake capacity requirement of the first compression stage in the process of the invention is substantially less than the intake capacity requirement of the compression stage in the prior art process. Thus a smaller compressor size can be used, with attendant cost savings.

EXAMPLE 3

A computer calculation was performed to evaluate the performance of the process of the invention in treating an off-gas stream from a fluid catalytic cracker. The process was assumed to produce about 6 million scfd of off-gas from the catalytic cracker, at 35° C. and 50 psia, with the following mol% composition:

| | |
|---|---|
| Hydrogen | 30 |
| Methane | 15 |
| Ethane | 12.5 |
| Propane | 10 |
| n-Butane | 2 |
| n-Pentane | 2 |
| Ethylene | 10 |
| Propylene | 18.5 |

Two calculations, the first representing a prior art process, the second representing a typical process of the invention, were performed.

(a) Not in Accordance with the Invention

The first calculation, not in accordance with the invention, assumed that the off-gas was treated by the prior art process shown in FIG. 4, and described in Example 2(a), to recover propylene and hydrogen for reuse. In this case, however, condensate stream 406 was recovered as the final propylene product stream, rather than being subjected to a flashing step. The results of the calculations are shown in Table 6.

TABLE 6

(Not in Accordance with the Invention)

| Stream | 401 | 406 | 413 |
|---|---|---|---|
| Flow (lbmol/h) | 683 | 295 | 387 |
| Mass flow (lb/h) | 16,632 | 11,807 | 4,818 |
| Temp. (° C.) | 35 | 25 | −6 |
| Pressure (psia) | 50 | 450 | 440 |
| Component (mol %): | | | |
| Hydrogen | 30.0 | 1.4 | 51.8 |
| Methane | 15.0 | 2.5 | 24.5 |
| Ethane | 12.5 | 14.5 | 11.0 |
| Propane | 10.0 | 20.8 | 1.8 |
| n-Butane | 2.0 | 4.6 | — |
| n-Pentane | 2.0 | 4.6 | — |
| Ethylene | 10.0 | 11.9 | 8.5 |
| Propylene | 18.5 | 39.7 | 2.3 |
| Component lb/h) | | | |
| Hydrogen | 413 | 8.4 | 404 |
| Methane | 1,642 | 119 | 1,523 |
| Ethane | 2,565 | 1,289 | 1,276 |
| Propane | 3,009 | 2,702 | 306 |
| n-Butane | 793 | 791 | 2.4 |
| n-Pentane | 985 | 984 | 0.3 |
| Ethylene | 1,914 | 984 | 924 |
| Propylene | 5,312 | 4,930 | 381 |

— = <0.1

Membrane area=800 m$^2$
Theoretical compressor horsepower=2,480 hp
Compressor intake suction flow rate=4,293 acfm As can be seen, the process separates the off-gas into a condensate stream, containing about 50% ethylene and propylene, which may be sent to fractionation or other treatment to yield olefin feedstocks for petrochemical processes, and a hydrogen stream, containing about 52% hydrogen, which may for further upgrading, such as by PSA, to yield a hydrogen product stream for further use in the refinery. The theoretical compressor horsepower requirement to carry out this separation is 2,480 hp.

(b) Process of the Invention

The second calculation assumed that the same volume of off-gas, of the same composition, was treated according to the process of the invention, as shown in FIG. 1 and described in Example 2(b). All of the membranes used in the process were again assumed to be silicone rubber membranes. The results of the calculation are shown in Table 7.

TABLE 7

Hydrogen and propylene recovery from a fluid catalytic cracker off-gas

| Stream | 101 | 109 | 115 |
|---|---|---|---|
| Flow (lbmol/h) | 683 | 285 | 397 |
| Mass flow (lb/h) | 16,632 | 11,436 | 5,192 |
| Temp. (° C.) | 35 | 25 | −8 |
| Pressure (psia) | 50 | 450 | 430 |
| Component (mol %) | | | |
| Hydrogen | 30.0 | 1.5 | 50.5 |
| Methane | 15.0 | 2.6 | 23.9 |
| Ethane | 12.5 | 14.1 | 11.3 |
| Propane | 10.0 | 20.9 | 2.2 |
| n-Butane | 2.0 | 4.8 | — |
| n-Pentane | 2.0 | 4.8 | — |
| Ethylene | 10.0 | 11.3 | 9.0 |
| Propylene | 18.5 | 40.0 | 3.1 |
| Component (lb/h) | | | |

TABLE 7-continued

Hydrogen and propylene recovery from a fluid catalytic cracker off-gas

| Hydrogen | 413 | 8.3 | 404 |
| Methane | 1,642 | 117 | 1,525 |
| Ethane | 2,565 | 1,211 | 1,352 |
| Propane | 3,009 | 2,623 | 386 |
| n-Butane | 793 | 788 | 4.8 |
| n-Pentane | 985 | 984 | 0.8 |
| Ethylene | 1,914 | 909 | 1,004 |
| Propylene | 5,312 | 4,796 | 515 |

— = <0.1

Membrane area=800 m$^2$
Theoretical compressor horsepower=2,086 hp
Compressor intake suction flow rate=3,151 acfm As can be seen, the process of the invention uses the same amount of membrane area, but significantly less horsepower, 2,480 theoretical hp versus 2,086 theoretical hp, or only 84% of the power of the prior art process, to achieve a very similar separation. Furthermore, the intake capacity of the first compressor is only 3,151, allowing a significantly smaller compressor size than in the prior art case.

We claim:

1. A process for separating an organic component from a gas stream, comprising the organic component and a second gas, the process comprising the steps of:
   (a) passing the gas stream through a first compression stage and a second compression stage in series, thereby forming a compressed stream;
   (b) withdrawing at least a portion of the organic component from the compressed stream as a withdrawn stream, thereby leaving a remaining stream;
   (c) performing a first membrane separation step, comprising:
      (i) providing a first membrane having a first feed side and a first permeate side;
      (ii) passing the remaining stream over the first feed side under conditions in which there is a pressure drop between the first feed side and the first permeate side;
      (iii) withdrawing from the first feed side a first residue stream enriched in the second gas compared with the remaining stream;
      (iv) withdrawing from the first permeate side a first permeate stream enriched in the organic component compared with the remaining stream;
   (d) performing a second membrane separation step, comprising:
      (i) providing a second membrane having a second feed side and a second permeate side;
      (ii) passing the first residue stream over the second feed side under conditions in which there is a pressure drop between the second feed side and the second permeate side;
      (iii) withdrawing from the second feed side a second residue stream enriched in the second gas compared with the first residue stream;
      (iv) withdrawing from the second permeate side a second permeate stream enriched in the organic component compared with the first residue stream;
   (e) recirculating at least a portion of the first permeate stream to the second compression stage;
   (f) recirculating at least a portion of the second permeate stream to the first compression stage.

2. The process of claim 1, wherein the second gas comprises nitrogen.

3. The process of claim 1, wherein the second gas comprises hydrogen.

4. The process of claim 1, wherein the second gas comprises methane.

5. The process of claim 1, wherein the gas stream comprises an effluent stream from a petrochemical manufacturing process.

6. The process of claim 1, wherein the gas stream comprises an effluent stream from a refinery process.

7. The process of claim 1, wherein the gas stream comprises natural gas.

8. The process of claim 1, wherein the gas stream comprises an effluent stream from a polyolefin manufacturing process.

9. The process of claim 1, wherein the organic component comprises a $C_{3+}$ hydrocarbon.

10. The process of claim 1, wherein the organic component comprises an olefin.

11. The process of claim 1, wherein the first membrane and the second membrane both comprise a silicone rubber selective layer.

12. The process of claim 1, wherein the first membrane and the second membrane are of unlike composition.

13. The process of claim 1, wherein the second compression stage raises the pressure of the gas stream to no more than about 1,000 psia.

14. The process of claim 1, wherein the first membrane separation step is operated at a pressure ratio of at least about 3 and no more than about 10.

15. The process of claim 1, wherein the first membrane separation step provides a selectivity for the organic component over the second gas of no more than about 25.

16. The process of claim 1, wherein step (b) comprises cooling and condensation and the withdrawn stream comprises liquefied organic component.

17. The process of claim 1, wherein step (b) comprises a process chosen from the group consisting of absorption, adsorption and membrane separation.

18. The process of claim 1, wherein the remaining stream contains the organic component in a concentration of at least about 10%.

19. The process of claim 1, wherein the first membrane separation step is operated at a pressure ratio $\phi$, the first membrane separation step provides a selectivity for the organic component over the second gas of $\alpha$, and $\alpha$ and $\phi$ satisfy a first relationship such that $\alpha/\phi \leq 5$.

20. The process of claim 1, wherein the first membrane separation step is operated at a pressure ratio $\phi$, the remaining stream contains the organic component in a concentration of at least about C%, and C and $\phi$ satisfy a second relationship such that $100/C \leq 5\phi$.

21. The process of claim 1, further comprising subjecting at least a portion of the second residue stream to additional treatment.

22. The process of claim 1, further comprising subjecting at least a portion of the withdrawn stream to additional treatment.

23. A process for treating an off-gas stream containing an olefin from a polyolefin manufacturing operation, the process comprising the steps of:
   (a) passing the off-gas stream through a first compression stage and a second compression stage in series, thereby forming a compressed stream;
   (b) withdrawing at least a portion of the olefin from the compressed stream as a withdrawn stream, thereby leaving a remaining stream;

(c) performing a first membrane separation step, comprising:
  (i) providing a first membrane having a first feed side and a first permeate side;
  (ii) passing the remaining stream over the first feed side under conditions in which there is a pressure drop between the first feed side and the first permeate side;
  (iii) withdrawing from the first feed side a first residue stream depleted in the olefin compared with the remaining stream;
  (iv) withdrawing from the first permeate side a first permeate stream enriched in the olefin compared with the remaining stream;
(d) performing a second membrane separation step, comprising:
  (i) providing a second membrane having a second feed side and a second permeate side;
  (ii) passing the first residue stream over the second feed side under conditions in which there is a pressure drop between the second feed side and the second permeate side;
  (iii) withdrawing from the second feed side a second residue stream depleted in the olefin compared with the first residue stream;
  (iv) withdrawing from the second permeate side a second permeate stream enriched in the olefin compared with the first residue stream;
(e) recirculating at least a portion of the first permeate stream to the second compression stage;
(f) recirculating at least a portion of the second permeate stream to the first compression stage.

24. The process of claim 23, wherein the first membrane separation step is operated at a pressure ratio of at least about 3 and less than about 10.

25. The process of claim 23, wherein the off-gas stream further comprises a $C_{3+}$ hydrocarbon, wherein step (b) comprises cooling and condensation and the withdrawn stream comprises condensed $C_{3+}$ hydrocarbon.

26. The process of claim 25, further comprising lowering the pressure of the withdrawn stream, thereby forming a light gas stream and an organic product stream.

27. The process of claim 23, wherein the first membrane separation step is operated at a pressure ratio $\phi$, the first membrane separation step provides a selectivity for the olefin over nitrogen of a and $\alpha$ and $\phi$ satisfy a first relationship such that $\alpha/\phi \leq 5$.

28. The process of claim 23, wherein the first membrane separation step is operated at a pressure ratio $\phi$, the remaining stream contains the olefin in a concentration of at least about C % and C and $\phi$ satisfy a second relationship such that $100/C \leq 5\phi$.

29. A process for treating a refinery off-gas stream containing hydrogen and a $C_{3+}$ hydrocarbon, the process comprising the steps of:
(a) passing the off-gas stream through a first compression stage and a second compression stage in series, thereby forming a compressed stream;
(b) withdrawing at least a portion of the $C_{3+}$ hydrocarbon from the compressed stream as a withdrawn stream, thereby leaving a remaining stream;
(c) performing a first membrane separation step, comprising:
  (i) providing a first membrane having a first feed side and a first permeate side;
  (ii) passing the remaining stream over the first feed side under conditions in which there is a pressure drop between the first feed side and the first permeate side;
  (iii) withdrawing from the first feed side a first residue stream enriched in hydrogen compared with the remaining stream;
  (iv) withdrawing from the first permeate side a first permeate stream enriched in $C_{3+}$ hydrocarbon compared with the remaining stream;
(d) performing a second membrane separation step, comprising:
  (i) providing a second membrane having a second feed side and a second permeate side;
  (ii) passing the first residue stream over the second feed side under conditions in which there is a pressure drop between the second feed side and the second permeate side;
  (iii) withdrawing from the second feed side a second residue stream enriched in hydrogen compared with the first residue stream;
  (iv) withdrawing from the second permeate side a second permeate stream enriched in $C_{3+}$ hydrocarbon compared with the first residue stream;
(e) recirculating at least a portion of the first permeate stream to the second compression stage;
(f) recirculating at least a portion of the second permeate stream to the first compression stage.

30. The process of claim 29, wherein the first membrane separation step is operated at a pressure ratio of at least about 3 and less than about 10.

31. The process of claim 29, wherein step (b) comprises cooling and condensation and the withdrawn stream comprises condensed $C_{3+}$ hydrocarbon.

32. The process of claim 31, further comprising lowering the pressure of the withdrawn stream, thereby forming a light gas stream and an LPG stream.

33. The process of claim 29, wherein the first membrane separation step is operated at a pressure ratio $\phi$, the first membrane separation step provides a selectivity for the $C_{3+}$ hydrocarbon over hydrogen of a and a and q) satisfy a first relationship such that $\alpha/\phi \leq 5$.

34. The process of claim 29, wherein the first membrane separation step is operated at a pressure ratio $\phi$, the remaining stream contains the $C_{3+}$ hydrocarbon in a concentration of at least about C % and C and $\phi$ satisfy a second relationship such that $100/C \leq 5$.

35. A process for treating a natural gas stream containing methane and a $C_{3+}$ hydrocarbon, the process comprising the steps of:
(a) passing the natural gas stream through a first compression stage and a second compression stage in series, thereby forming a compressed stream;
(b) withdrawing at least a portion of the $C_{3+}$ hydrocarbon from the compressed stream as a withdrawn stream, thereby leaving a remaining stream;
(c) performing a first membrane separation step, comprising:
  (i) providing a first membrane having a first feed side and a first permeate side;
  (ii) passing the remaining stream over the first feed side under conditions in which there is a pressure drop between the first feed side and the first permeate side;
  (iii) withdrawing from the first feed side a first residue stream enriched in methane compared with the remaining stream;
  (iv) withdrawing from the first permeate side a first permeate stream enriched in $C_{3+}$ hydrocarbon compared with the remaining stream;

(d) performing a second membrane separation step, comprising:
  (i) providing a second membrane having a second feed side and a second permeate side;
  (ii) passing the first residue stream over the second feed side under conditions in which there is a pressure drop between the second feed side and the second permeate side;
  (iii) withdrawing from the second feed side a second residue stream depleted in $C_{3+}$ hydrocarbon compared with the first residue stream;
  (iv) withdrawing from the second permeate side a second permeate stream enriched in $C_{3+}$ hydrocarbon compared with the first residue stream;
(e) recirculating at least a portion of the first permeate stream to the second compression stage;
(f) recirculating at least a portion of the second permeate stream to the first compression stage.

36. The process of claim 35, wherein the first membrane separation step is operated at a pressure ratio of at least about 3 and less than about 10.

37. The process of claim 35, wherein step (b) comprises cooling and condensation and the withdrawn stream comprises condensed $C_{3+}$ hydrocarbon.

38. The process of claim 37, further comprising lowering the pressure of the withdrawn stream, thereby forming a light gas stream and an NGL stream.

39. The process of claim 35, wherein the first membrane separation step is operated at a pressure ratio $\phi$, the first membrane separation step provides a selectivity for the $C_{3+}$ hydrocarbon over methane of $\alpha$ and $\alpha$ and $\phi$ satisfy a first relationship such that $\alpha/\phi \leq 5$.

40. The process of claim 35, wherein the first membrane separation step is operated at a pressure ratio $\phi$, the remaining stream contains the $C_{3+}$ hydrocarbon in a concentration of at least about C % and C and $\phi$ satisfy a second relationship such that $100/C \leq 5\phi$.

* * * * *